(12) United States Patent
Feaver et al.

(10) Patent No.: US 7,723,262 B2
(45) Date of Patent: May 25, 2010

(54) ACTIVATED CARBON CRYOGELS AND RELATED METHODS

(75) Inventors: Aaron Feaver, Seattle, WA (US); Guozhong Cao, Seattle, WA (US)

(73) Assignees: EnerG2, LLC, Seattle, WA (US); University of Washington, Seattle, WA (US)

( * ) Notice: Subject to any disclaimer, the term of this patent is extended or adjusted under 35 U.S.C. 154(b) by 595 days.

(21) Appl. No.: 11/284,140

(22) Filed: Nov. 21, 2005

(65) Prior Publication Data

US 2007/0113735 A1  May 24, 2007

(51) Int. Cl.
*C01B 31/08* (2006.01)
(52) U.S. Cl. ...................... 502/416; 502/418
(58) Field of Classification Search .......... 502/416–439
See application file for complete search history.

(56) References Cited

U.S. PATENT DOCUMENTS

| | | | |
|---|---|---|---|
| 4,082,694 A | 4/1978 | Wennerberg et al. | |
| 4,580,404 A | 4/1986 | Pez et al. | |
| 4,862,328 A | 8/1989 | Morimoto et al. | |
| 4,873,218 A * | 10/1989 | Pekala | 502/418 |
| 4,954,469 A | 9/1990 | Robinson | |
| 4,997,804 A * | 3/1991 | Pekala | 502/418 |
| 5,260,855 A | 11/1993 | Kaschmitter et al. | |
| 5,416,056 A | 5/1995 | Baker | |
| 5,420,168 A | 5/1995 | Mayer et al. | |
| 5,508,341 A | 4/1996 | Mayer et al. | |
| 5,529,971 A * | 6/1996 | Kaschmitter et al. | 502/416 |
| 5,626,637 A | 5/1997 | Baker | |
| 5,626,977 A | 5/1997 | Mayer et al. | |
| 5,710,092 A | 1/1998 | Baker | |
| 5,789,338 A | 8/1998 | Kaschmitter et al. | |
| 5,945,084 A | 8/1999 | Droege | |
| 5,965,483 A | 10/1999 | Baker et al. | |
| 6,006,797 A | 12/1999 | Bulow et al. | |
| 6,064,560 A * | 5/2000 | Hirahara et al. | 361/502 |
| 6,225,257 B1 | 5/2001 | Putyera et al. | |
| 6,309,446 B1 * | 10/2001 | Nakanoya et al. | 95/102 |
| 6,592,838 B1 | 7/2003 | Nomoto et al. | |
| 2002/0114126 A1 | 8/2002 | Hirahara et al. | |
| 2002/0172637 A1 | 11/2002 | Chesneau et al. | |

FOREIGN PATENT DOCUMENTS

WO     2004099073 A2     11/2004

OTHER PUBLICATIONS

Inomata, et al., Natural gas storage in activated carbon pellets without a binder, Carbon 2002; 40: 87-93.*

Feaver, et al., Activated carbon cryogels for low pressure methane storage, Carbon 2006; 44: 590-593.*

Alcaniz-Monge, J., et al., "Methane Storage in Activated Carbon Fibres," *Carbon* 35(2):291-7, 1997.

(Continued)

*Primary Examiner*—Stanley S. Silverman
*Assistant Examiner*—Daniel C. McCracken
(74) *Attorney, Agent, or Firm*—Seed IP Law Group PLLC

(57) ABSTRACT

Carbon cryogels, methods for making the carbon cryogels, methods for storing a gas using the carbon cryogels, and devices for storing and delivering a gas using the carbon cryogels.

27 Claims, 9 Drawing Sheets

OTHER PUBLICATIONS

Barton, T.J., et al., "Tailored Porous Materials," *Chemical Materials* 11(10):2633-2656, 1999.

Bock, V., et al., "Structural Investigation of Resorcinol Formaldehyde and Carbon Aerogels Using SAXS and BET," *Journal of Porous Materials* 4(4):287-94, 1997.

Burchell, T., and M. Rogers, "Low Pressure Storage of Natural Gas for Vehicular Applications," *Society of Automotive Engineers*, SAE Paper 2000-01-2205, 2000, pp. 1-5.

Czakkel, O., et al., "Influence of Drying on the Morphology of Resorcinol-Formaldehyde-Based Carbon Gels," *Microporous and Mesoporous Materials* 86:124-133, 2005.

Feaver, A., and G. Cao, "Activated Carbon Cryogels for Low Pressure Methane Storage," *Carbon* 44:587-610, 2006.

Imomata, K., et al., "Natural Gas in Activated Carbon Pellets Without a Binder," *Carbon* 40(1):87-93, 2002.

Lozano-Castello, D., et al., "Powdered Activated Carbons and Activated Carbon Fibers for Methane Storage: A Comparative Study," *Energy & Fuels* 16(5):1321-1328, 2002.

Pekala, R.W., "Organic Aerogels From the Polycondensation of Resorcinol With Formaldehyde," *Journal of Materials Science* 24(9):3221-227, 1989.

Perrin, A., et al., "Methane Storage Within Dry and Wet Active Carbons: A Comparative Study," *Energy & Fuels* 17(5):1283-291, 2003.

Tamon, H., et al., "Preparation of Mesoporous Carbon by Freeze Drying," *Carbon* 37(12):2049-55, 1999.

Yamamoto, T., et al., "Control of Mesoporosity of Carbon Gels Prepared by Sol-Gel Polycondensation and Freeze Drying," *Journal of Non-Crystalline Solids* 288:46-55, 2001.

Lozano-Castello, D et al., "Influence of proe structure and surface chemistry on electric double layer capacitance in non-aqueous electrolyte" Carbon. 2003; 41:1765.

Hsieh, C-T. et al., "Synthesis of mesoporous carbon composite and its electric double layer formation behavior" Microporous and Mesoporous Materials. 93, 2006, 232.

Kowaiczyk, P., et al., "Estimation of the pore-size distribution function from the nitrogen adsorption isotherm. Comparison of density functional theory and the method of Do and co-workers" Carbon. 41, 2003, 1113.

Pekala, RW, et al., "Structure of organic aerogels: morphology and scaling." Macromolecules. 1993; 26(20):5487.

Kocklenberg, R, et al., "Texture control of freeze-dried resorcinol-formaldehyde gels." Journal of Non-Crystalline Solids. 1998;2 25:8-13.

Reichenauer G, et al., "Microporosity in carbon aerogels." Journal of Non-Crystalline Solids. 1998; 225 :210-214.

Takeuchi, Yasushi, et al., "Removal of single component chlorinated hydrocarbon vapor by activated carbon of very high surface area," Separation of Purification Technology 15 (1999) 79-90.

* cited by examiner

ACTIVATED CARBON CRYOGELS AND RELATED METHODS

STATEMENT OF GOVERNMENT LICENSE RIGHTS

The invention was made by an agency of the United States Government or under a contract with an agency of the United States Government. The name of the United States Government agency is National Science Foundation/Integrative Graduate Education and Research Traineeship, and the Government contract number is DGE9987620AM006.

FIELD OF THE INVENTION

The present invention relates to carbon cryogels, methods for making the carbon cryogels, methods for storing a gas using carbon cryogels, and devices for storing and delivering a gas using carbon cryogels.

BACKGROUND OF THE INVENTION

Recent increases in demand for oil, associated price increases, and environmental issues are continuing to exert pressure on an already stretched world energy infrastructure. Natural gas, with an estimated 60-70 year reserve, represents a clean and abundant fossil fuel that could transition from this troubled oil and gasoline dominated market to the expected eventual adoption of renewable energy and hydrogen. However, one of the hurdles to widespread use of natural gas in automobiles and power plants is storage of the gas. An ideal gas storage vessel should contain gas at reasonable temperatures and pressures while maintaining a low weight, a small volume, and minimal cost. There are problems associated with highly compressed natural gas (CNG) and cryogenic liquid natural gas (LNG). One of the favored alternatives to these two storage methods is natural gas adsorbed on a microporous medium such as activated carbon. Adsorbed natural gas (ANG) has demonstrated storage performance competitive with CNG, but at pressures as low as 3.45 MPa (compared to 15.17 MPa for CNG). This relatively low pressure allows for easier tank filling, provides room for non-cylinder form factors, allows for optional tank materials and increases the safety of a tank.

Activated carbon is the dominant material in research on storage of adsorbed methane and is typically synthesized by pyrolysis (i.e., carbonization) and activation treatments on existing organic materials such as coconut fibers, carbon fibers, and even tire rubber. However, few of these precursor materials can be easily engineered to any significant degree.

A need exists for a carbon cryogel having a microporous structure that can be tuned by varying sol-gel parameters to produce a carbon cryogel for low pressure methane storage. The present invention seeks to fulfill this need and provides further related advantages.

SUMMARY OF THE INVENTION

In one aspect, the present invention provides a carbon cryogel having a density of from about 0.20 to about 1.0 g/cm$^3$, a surface area of from about 500 to about 3000 m$^2$/g, a total pore volume of from about 1.0 to about 1.5 cm$^3$/g, and a gas storage capacity of from about 0.0010 to about 0.015 mole/g at room temperature and at 500 psi.

In one embodiment, the cryogel has a density from about 0.25 to about 0.75 g/cm$^3$.

In one embodiment, the cryogel has a surface area from about 1500 to about 3000 m$^2$/g.

In one embodiment, the cryogel has a pore volume from about 1.2 to about 1.4 cm$^3$/g.

In one embodiment, the cryogel has a gas storage capacity from about 0.005 to about 0.010 mole/g.

The carbon cryogel of the invention can store a variety of gases. Representative gases that can be stored by the carbon cryogel include methane, hydrogen, nitrogen, carbon monoxide, fluorine, nitric oxide, nitrogen trifluoride, silane, ethylene, boron trifluoride, phosphine, arsine, disilane, and carbon tetrafluoride.

The carbon cryogel of the invention is obtainable by the process of:

(a) preparing a sol by mixing resorcinol, formaldehyde, and a catalyst in water;

(b) gelling the sol by heating at a temperature and for a time sufficient to provide a gel;

(c) washing the gel with acid to provide an acid-washed gel comprising an aqueous solvent;

(d) washing the acid-washed gel with a suitable organic solvent to exchange the aqueous solvent for an organic solvent to provide a solvent-exchanged gel;

(e) freeze drying the solvent-exchanged gel; and (f) pyrolyzing the solvent-exchanged gel to provide a carbon cryogel, wherein the cryogel has a gas storage capacity of from about 0.0010 to about 0.05 mole/g.

In another aspect of the invention, a method for making a carbon cryogel is provided. The method includes the steps of (a) preparing a sol by mixing resorcinol, formaldehyde, and a catalyst in water;

(b) gelling the sol by heating at a temperature and for a time sufficient to provide a gel;

(c) washing the gel with acid to provide an acid-washed gel comprising an aqueous solvent;

(d) washing the acid-washed gel with a suitable organic solvent to exchange the aqueous solvent for an organic solvent to provide a solvent-exchanged gel;

(e) freeze drying the solvent-exchanged gel; and (f) pyrolyzing the solvent-exchanged gel to provide a carbon cryogel.

In one embodiment, the method further comprising heating the carbon cryogel at a temperature and for a time sufficient to provide an activated carbon cryogel.

In one embodiment, the activation temperature is about 900° C. and the time is from about 10 to about 120 minutes.

In one embodiment, activation is from about 5 to about 90%.

In one embodiment, the molar ratio of resorcinol to catalyst is from about 10 to about 300.

In one embodiment, the catalyst is sodium carbonate.

In one embodiment, the weight ratio of resorcinol to water is from about 0.01 to about 2.0.

In one embodiment, gelling the sol comprises heating at a temperature and for a period of time sufficient to convert the sol to a crosslinked gel. In one embodiment, gelling the sol comprises heating at about 90° C. for from about 1 to about 7 days.

In one embodiment, washing the gel with acid comprises washing the gel with aqueous trifluoroacetic acid.

In one embodiment, washing the acid-washed gel comprises washing the gel with t-butanol.

In one embodiment, pyrolyzing the solvent-exchanged gel comprises heating at a temperature and for a period of time sufficient to convert the gel to a carbon cryogel. In one embodiment, pyrolyzing the solvent-exchanged gel comprises heating at about 1050° C. for about 4 hours under nitrogen.

In one embodiment, heating at a temperature and for a time sufficient to provide an activated carbon cryogel comprises heating at about 900° C. under carbon dioxide.

In another aspect, the invention provides a method for gas storage. In the method, gas is stored by contacting a vessel containing an adsorbate with a gas, wherein the adsorbate comprises a carbon cryogel having a density of from about 0.20 to about 1.0 g/cm$^3$, a surface area of from about 500 to about 3000 m$^2$/g, a total pore volume of from about 1.0 to about 1.5 cm$^3$/g, and a gas storage capacity of from about 0.0010 to about 0.015 mole/g at room temperature and at 500 psi. In one embodiment, the gas is methane.

In another aspect of the invention, a gas storage vessel is provided. The gas storage vessel comprises a pressurizable vessel including a carbon cryogel having a density of from about 0.20 to about 1.0 g/cm$^3$, a surface area of from about 500 to about 3000 m$^2$/g, a total pore volume of from about 1.0 to about 1.5 cm$^3$/g, and a gas storage capacity of from about 0.0010 to about 0.015 mole/g at room temperature and at 500 psi.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1A:
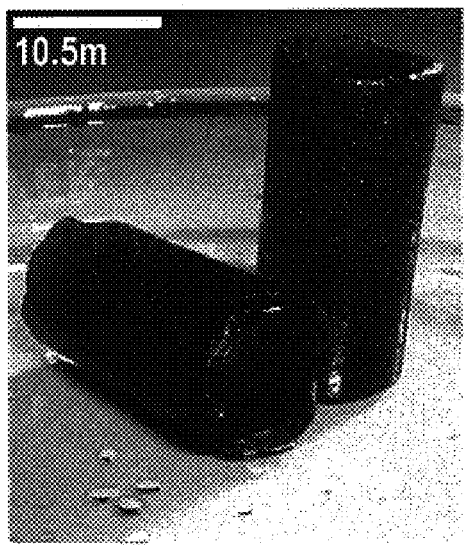
FIGS. 1A-1C are images of an RF hydrogel, an RF cryogel, a representative carbon cryogel of the invention, respectively.

In one aspect, the present invention provides a carbon cryogel. The carbon cryogel is a porous sorbent having a surface area and a micropore volume such that gases can be densely adsorbed onto the surface of or condensed into the cryogel micropores. When gases are adsorbed on the surface of the cryogel, their density is about that of highly compressed gas. Adsorption using a carbon cryogel of the invention does not require extreme temperatures or pressures. Therefore, a vessel containing a carbon cryogel of the invention allows the vessel to contain either more gas per unit volume, or a similar amount of gas at lower pressure or higher temperature.

The carbon cryogel of the invention is a sol gel-derived, highly porous, high surface area material. The cryogel is an interconnected micro-/meso-porous carbon material that can adsorb large volumes of gas (e.g., methane) at moderate temperature and pressure. The cryogel can act as a gas storage medium when added to a pressure vessel.

The carbon cryogel is a substantially pure carbon material characterized as having a large surface area, large pore volume with small pore size, and a relatively high density.

The carbon cryogel has a surface area of from about 500 m$^2$/g to about 3000 m$^2$/g. In one embodiment, the cryogel has a surface area of from about 1000 m$^2$/g to about 2500 m$^2$/g. In one embodiment, the cryogel has a surface area of from about 1500 to about 3000 m$^2$/g. In one embodiment, the cryogel has a surface area of from about 2000 m$^2$/g to about 3000 m$^2$/g. In one embodiment, the cryogel has a surface area of from about 2500 m$^2$/g to about 3000 m$^2$/g.

The cryogel has a total pore volume of from about 1.0 to about 1.5 cm$^3$/g. In one embodiment, the cryogel has a total pore volume (single point nitrogen adsorption) of from about 1.2 to about 1.4 cm$^3$/g. The cryogel has a maximum pore size distribution that can be engineered to be less than about 5 nm. In one embodiment, the cryogel has a maximum pore size distribution of less than about 5 nm. In one embodiment, the cryogel has a maximum pore size distribution of from about 0.5 nm to about 2.0 nm.

The cryogel has an uncompacted (i.e., loose) powder density of from about 0.20 to about 1.0 g/cm$^3$. In one embodiment, the cryogel has a density of from about 0.25 to about 0.75 g/cm$^3$. In one embodiment, the cryogel has a density of from about 0.30 to about 0.50 g/cm$^3$.

The cryogel has a gas storage capacity of from about 0.0010 to about 0.015 mole/g. In one embodiment, the cryogel has a gas storage capacity of from about 0.005 to about 0.010 mole/g.

Representative carbon cryogels of the invention have the following gas storage capacities (see Table 2):

| mole/g | 0.0010-0.0131 |
|---|---|
| V/V (loose powder) | 22-118 |
| % Gravimetric | 1.63-21.05 |

The terms "mole/g" and "V/V" relate to the cryogel's gas (i.e., methane) storage performance. The term "mole/g" relates to the gravimetric storage capacity and refers to moles methane stored per gram carbon. The gravimetric storage capacity is indicative of the cryogel's microporous structure. The term "V/V" relates to the volumetric storage capacity and refers to the ratio of the volume that the stored gas would occupy at standard temperature and pressure to the volume that the uncompacted powder sample occupies. The term "% Gravimetric" relates the moles of stored gas (i.e., methane) to the mass of stored gas and is defined as 100× gas weight/carbon weight.

In another aspect, the present invention provides a gas storage system that includes a quantity of a carbon cryogel of the invention and a vessel suitable for receiving the carbon cryogel and the gas to be stored.

A carbon cryogel of the invention can be placed in a pressurizeable vessel in either compacted powder form or its natural monolithic form. Due to the relatively low pressures involved, the vessel can be fitted to any number of forms (e.g., non-cylindrical). Electrical contacts can be placed in a manner such that a current can be passed through the cryogel to enhance gas desorption. Alternately, heating elements can be placed in the vessel to aid desorption. The vessel can be designed for a wide range of storage capacities from relatively small portable units to relatively large stationary tanks. Gas storage capacity depends on the nature of the carbon cryogel used. The storage capacity of a tank is determined by multiplying the V/V performance of the particular carbon cryogel in use by the internal volume of the storage vessel. For natural gas storage applications, a filter adsorbent unit can be placed such that gas exiting or entering the main storage vessel passes through the adsorbent. The adsorbent in the filter can be a carbon cryogel designed specially for removing certain contaminants and odorants present in most natural gas lines. The filter can be temperature controlled to either adsorb or desorb contaminants depending on whether gas is exiting or entering the main storage vessel. Gas enters and exits the system by pressurizing or depressurizing (i.e., to fill the vessel pressure is applied and to empty the vessel pressure is released. Methane can enter and exit the storage device through pressurized lines including a manifold that allows gas to enter from a methane source (e.g., filling station, pump, pipeline) and exit to the desired location (e.g., engine, fuel cell reformer, pipeline).

In another aspect of the invention, methods for making a carbon cryogel are provided. The carbon cryogel is fabricated from resorcinol, formaldehyde, water, and a catalyst. The cryogel can be made by the following representative multi-step sequence:

(1) preparing an initial sol by mixing resorcinol (e.g., 50 parts by weight), formaldehyde (e.g., 100 parts by weight), and sodium carbonate (e.g., 1 part by weight) in water (e.g., to provide a 5% by weight solution);

(2) gelling the sol by heating at a temperature and for a time (e.g., 90° C. for 1-7 days) sufficient to provide a gel (i.e., hydrogel);

(3) acid washing the gel by agitating in an acid bath to provide an acid-washed gel (e.g., 0.125% by weight trifluoroacetic acid in water at 45° C. for 3 days, pH=1.9);

(4) washing the acid-washed gels by solvent exchange (e.g., t-butanol, 10 times volume, repeated 3 times) to provide a solvent-exchanged gel;

(5) freeze drying the solvent-exchanged gel (e.g., 3 hours at 263° K. and then vacuum for 3 days) to provide an organic cryogel; and (6) pyrolyzing the organic cryogel (e.g., 1050° C. for 4 hours under nitrogen) to provide a carbon cryogel.

The carbon cryogel can be optionally activated by heating at elevated temperature in a carbon dioxide atmosphere (e.g., 900° C. under carbon dioxide) to provide an activated carbon cryogel. Activation substantially increases micropore volume and provides carbon cryogels having high pore volume, high surface area, and low pore sizes.

In one embodiment, the carbon cryogel is fabricated from a phenolic compound (e.g., resorcinol (R)), formaldehyde (F), water (W), and a catalyst (C).

Phenolic compounds can be reacted with formaldehyde in the presence of a basic catalyst to provide a polymeric gel (crosslinked gel). Suitable phenolic compounds include a polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used.

The ratios of these materials (e.g., R/C and R/W), as well as the processing parameters, determine the ultimate structure and properties of the product carbon cryogels.

Representative carbon cryogels were prepared from the following ranges of materials and levels of activation with carbon dioxide to increase surface area (see Table 1):

| R/C | 10-300 |
|---|---|
| R/W | 0.05-2.0 |
| % Activation | 7-78 |

R/C is the molar ratio of resorcinol to catalyst used in making the cryogel; R/W is the weight ratio of resorcinol to water used in making the cryogel; and % Activation is the percent by weight of original material removed by the activation process.

For cryogels having R/W=0.25 and 67-78% activation, advantageous BET surface area (2400 to 2600 m$^2$/g), total pore volume (1.0 to 1.5 cm$^3$/g), and % gravimetric methane (15 to 20) values were observed for cryogels made with R/C from about 20 to about 60, particularly 25 and 50.

In one embodiment, the carbon cryogel has a density of from about 0.20 to about 1.0 g/cm$^3$, a surface area of from about 1500 to about 2000 m$^2$/g, a total pore volume of from about 1.0 to about 1.5 cm$^3$/g, and a gas storage capacity of from about 0.0010 to about 0.015 mole/g.

As noted above, the carbon cryogel of the invention is prepared from an organic hydrogel that is solvent exchanged with a suitable organic solvent and freeze dried to provide an organic cryogel, which is then pyrolyzed to provide the carbon cryogel. The carbon cryogel can be activated by reaction with carbon dioxide at elevated temperature to provide an activated cryogel. The preparation and characteristics of the organic cryogels, carbon cryogels, and activated cryogels is described below.

Figure 3A:
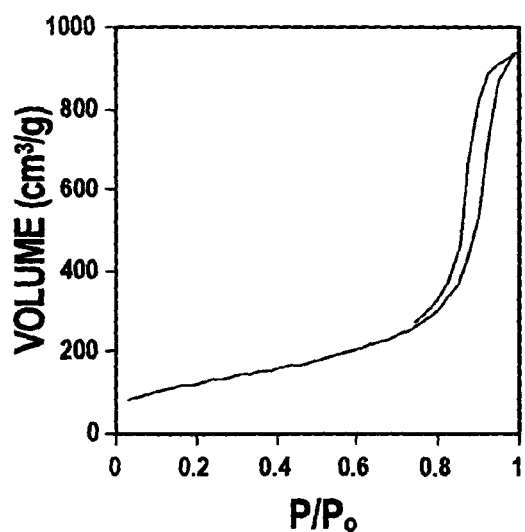
FIGS. 3A-3D are graphs illustrating nitrogen adsorption isotherms and pore size distributions for representative RF cryogels formed in accordance with the invention having R/W constant at 0.005 and R/C 50 (FIG. 3A (nitrogen adsorption) and FIG. 3B (pore size distribution)) and R/C 300 (FIG. 3C (nitrogen adsorption) and FIG. 3D (pore size distribution))
Figure 3B:
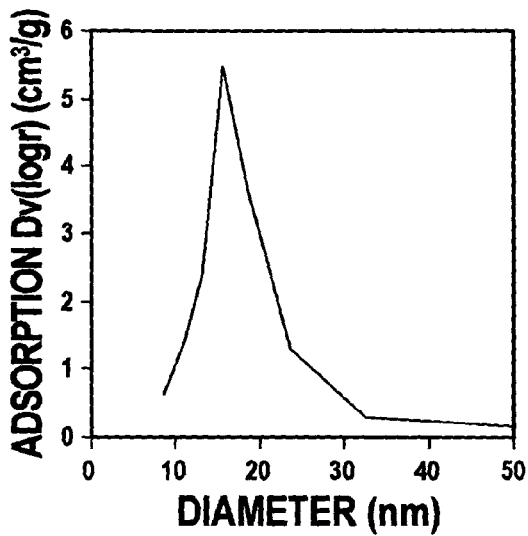
Figure 3C:
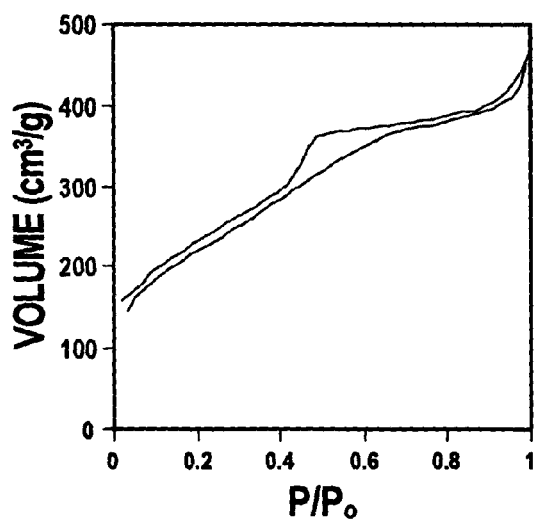
Figure 3D:
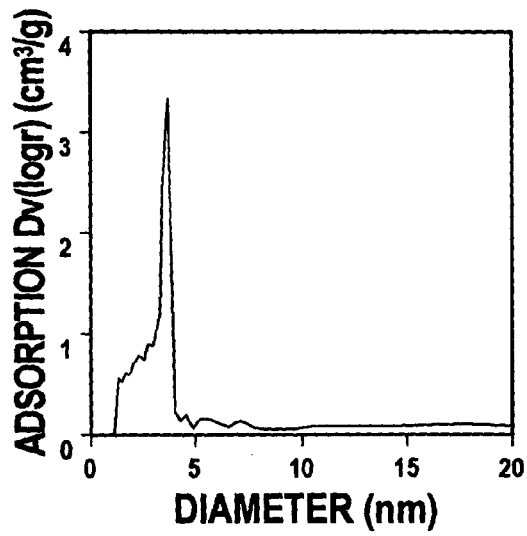

Organic Cryogels. Organic cryogels were prepared by freeze drying organic hydrogels. Relatively little volume loss occurred on freeze drying, although freeze drying produced cryogels having some cracks (compare FIGS. 1A and 1B). Nitrogen sorption (i.e., adsorption and desorption) isotherms and pore size distribution of RF cryogels with R/C ratios of 50 and 300, respectively, are illustrated in FIGS. 3A-3D. Nitrogen sorption isotherms and pore size distributions for representative RF cryogels formed in accordance with the invention having R/W constant at 0.005 and R/C 50 are shown in FIG. 3A (nitrogen sorption) and FIG. 3B (pore size distribution), having R/W constant at 0.005 and R/C 300 are shown in FIG. 3C (nitrogen sorption) and FIG. 3D (pore size distribution).

Figure 4:
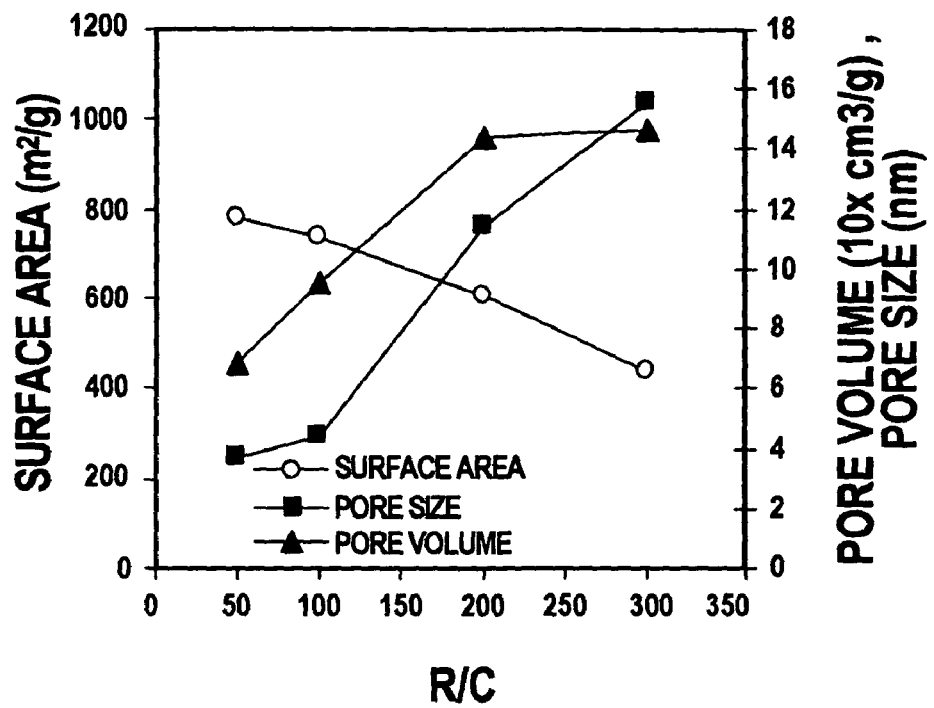
FIG. 4 is a graph comparing surface area (m$^2$/g), pore size (nm), and pore volume (10× cm$^3$/g) of RF cryogel as a function of R/C with R/W molar constant at 0.005.

As shown in the these figures, a change in R/C from 50 to 300 results in a change in average pore size from about 4 nm to about 16 nm. Pore size, surface area, and pore volume as a function of R/C with R/W molar constant at 0.05 is shown FIG. 4. The surface area of the RF cryogel decreases from 780 m$^2$/g to 439 m$^2$/g as R/C increases from 50 to 300. The pore volume increases from 0.68 cm$^3$/g for R/C 50 to 1.47 cm$^3$/g for R/C 300.

The material property changes can be explained by a phase separation that varies on a scale dependent on the amount of crosslinking that occurs as the material gels. If significant amounts of catalyst area available (low R/C), the result is a highly crosslinked polymer network that is relatively uniform. The phase separation between the polymer and the solvent occurs at the nanoscale level and results in a more microporous material with high surface area The overall pore volume is reduced because, although micropores increase the surface area, micropores are relatively small in volume. At the other end of the spectrum, if only small quantities of catalyst are available, then the reaction occurs more slowly with less crosslinking. This allows the material to phase separate on a larger scale resulting in more meso- and macropores and a correspondingly lower surface area. Thus, R/C is a key variable in producing the ideal surface area and micropore size.

The observed mechanical strength of RF hydrogels and cryogels varies noticeably with the sol composition. An increase in R/W results in an increased hardness of both RF hydrogels and cryogels, while an increase in R/C reduces the hardness of the resultant RF hydrogels and cryogels. Such change in mechanical strength can be ascribed to the strength of the gel network. An increased R/W was observed to result in a significantly reduced gelation time. For example, at a constant R/C of 75, the gelation time reduces from 10,000 minutes for R/W of 0.01 to 10 minutes for R/W of 1.00. This fast hydrolysis and condensation reaction results in a dense structured gel network.

Figure 1B:
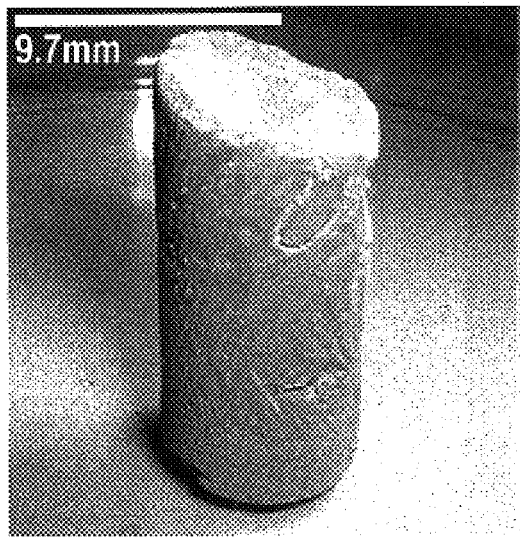
Figure 1C:
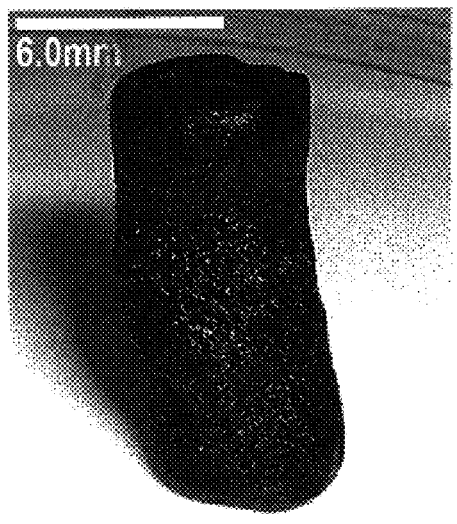
Figure 1D:
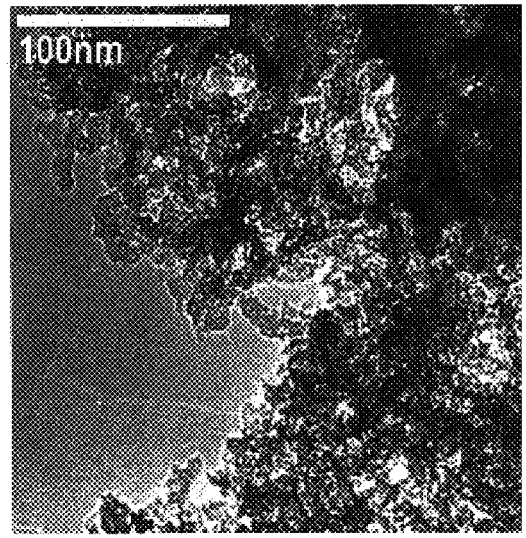
FIG. 1D is a transmission electron microscope (TEM) image (175,000×) of the carbon cryogel of FIG. 1C.
Figure 5:
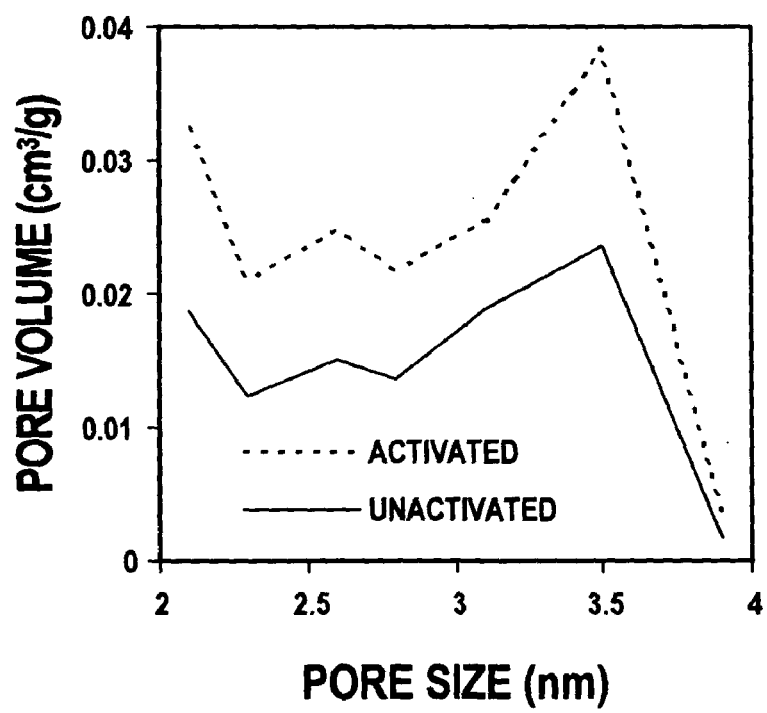
FIG. 5 is a graph comparing pore volume (cm$^3$/g) as a function of pore size distribution between 2-4 nm for representative activated (dashed line) and unactivated (solid line) carbon cryogels of the invention having R/C 50.

Carbon Cryogels. Carbon cryogels were prepared by pyrolyzing organic cryogels. The conversion of RF cryogels to carbon cryogels was typically accompanied by a volume loss (compare FIGS. 1B and 1C). The estimated volume loss was typically between about 60 to about 80 percent. The weight loss during pyrolysis was 47%±4%. The TEM image of a representative carbon cryogel is shown in FIG. 1D. Referring to FIG. 1D, the cryogel has a string-of-pearls-like-appearance. Subsequent activation of the carbon cryogels resulted in an increase in pore volume particularly in the microporous range as illustrated in FIG. 5. Activation occurs by the following reaction:

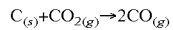

The representative carbon cryogel depicted in FIG. 5 was activated for 10 minutes, so the increase in micropore volume is attributed to a relatively small number of new micropores that were exposed as surface carbon material was removed. The activation process can eventually reach a point of diminishing returns where so much material is removed that the micropores begin to increase in diameter, thereby reducing the overall surfaces available for adsorption and diminishing the effectiveness of pores. It should be noted that FIG. 5 does not present the entire pore size distribution and this particular sample also possessed a significant mesoporous peak at about 55 nm. The mesoporous peak was reduced in volume (by about ⅔) after activation. It is presumed that this is due in part to a sintering effect that is not sufficiently offset by the above noted reaction, thus resulting in a net decrease in pore volume.

Figure 6:
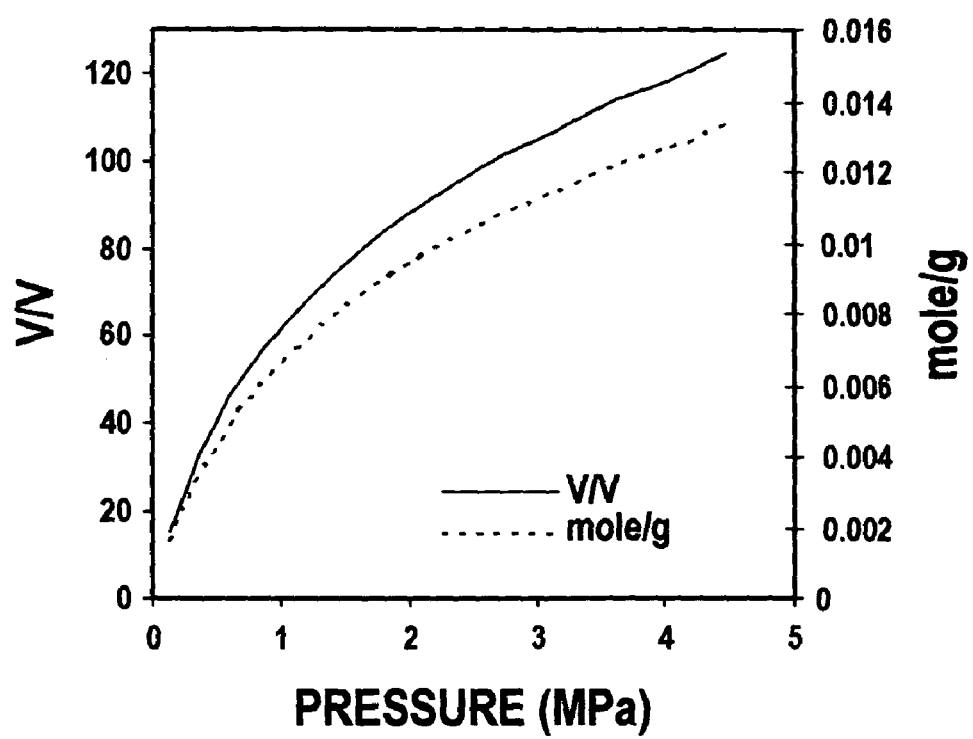
FIG. 6 is a graph illustrating methane adsorption curves (V/V and mole/g) as a function of pressure at room temperature for a representative carbon cryogel of the invention (Sample 7, see Table 1)

Methane Storage. Adsorption storage capacity for representative carbon cryogels of the invention are tabulated in Table 2. FIG. 6, as an example, shows the typical methane adsorption curves for a representative carbon cryogel of the invention (Sample 7, See Table 1) at room temperature, with V/V (solid line) and gravimetric storage (dashed line) as a function of pressure. V/V is not a material property as it is largely dependant on sample compaction. However, gravimetric storage capacity is indicative of the microporous structure of the cryogel.

Figure 7A:
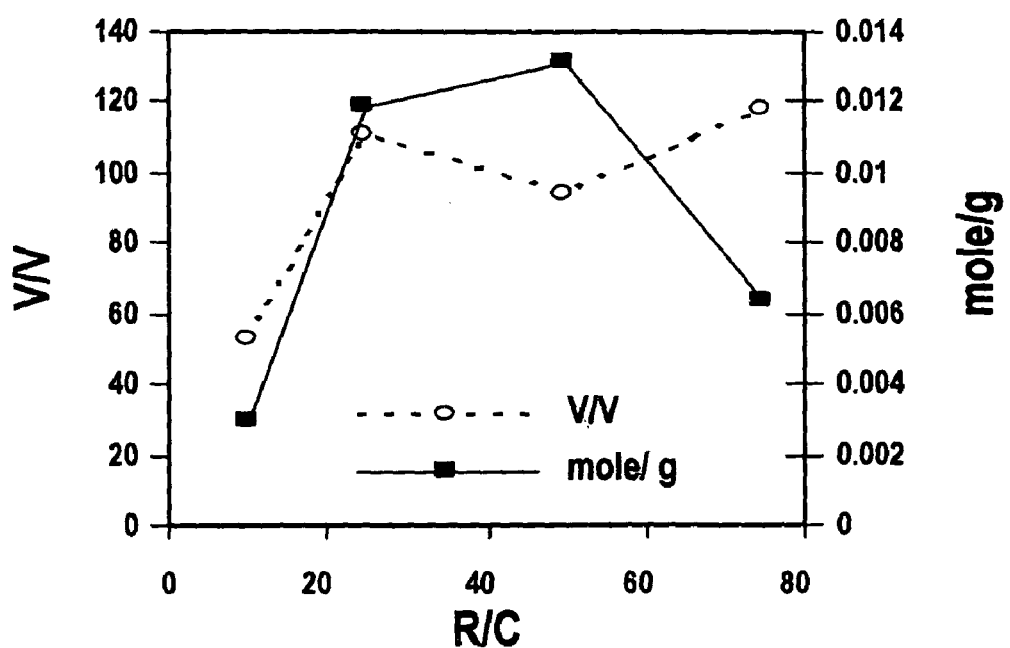
FIG. 7A is a graph comparing volumetric (V/V) and gravimetric (mole/g) methane storage performance as a function of R/C for representative carbon cryogels of the invention (Samples 2, 7, 11, and 18, see Table 1) having R/W 0.25 and activation levels from 67%-78%.
Figure 7B:
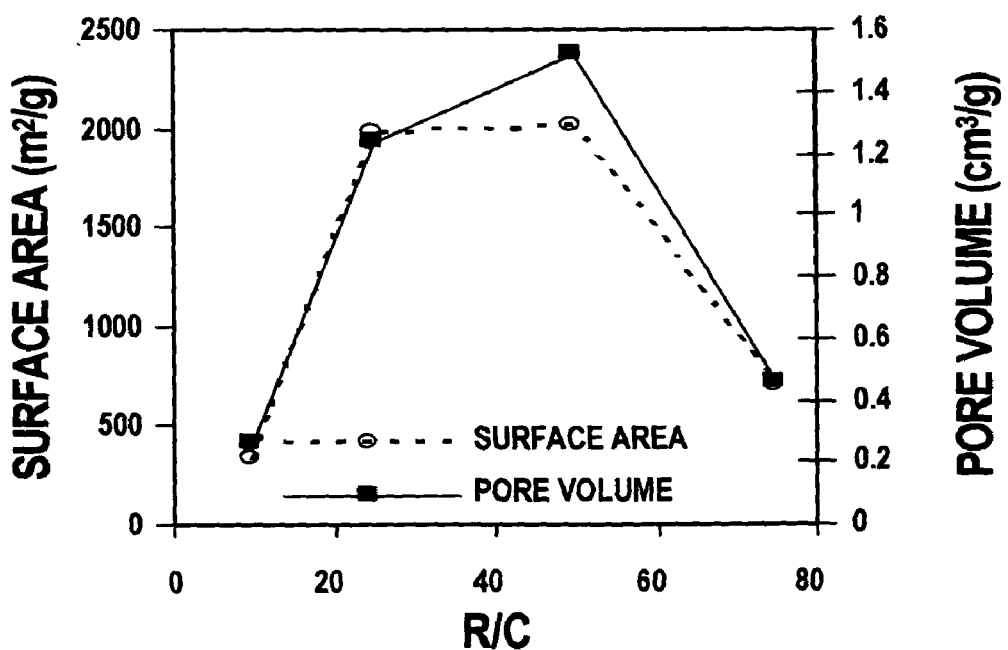
FIG. 7B is a graph comparing surface area and total pore volume as a function of R/C for representative carbon cryogels of the invention (Samples 2, 7, 11, and 18, see Table 1) having R/W 0.25 and activation levels from 67%-78%.

The effect of R/C on carbon cryogel methane storage capacity is illustrated in FIGS. 7A and 7B. FIG. 7A compares volumetric (V/V) and gravimetric (mole/g) methane storage performance as a function of R/C for representative carbon cryogels of the invention (Samples 2, 7, 11, and 18, see Table 1) having R/W 0.25 and activation levels from 67%-78%. Increasing R/C from 10 to 25 resulted in a dramatic increase in both gravimetric (about 4 times) and volumetric (about 2 times) storage capacity. The gravimetric storage capacity decreases substantially from its maximum of about 13 m mole/g (0.013 mole/g) at R/C 50 as R/C was increased to 75. However, the volumetric performance experienced only a small fluctuation when R/C was increased from 25 to 75. FIG. 7B shows both pore volume and BET surface area, as determined by nitrogen sorption isotherms at 77° K. FIG. 7B compares surface area and total pore volume as a function of R/C for representative carbon cryogels of the invention (Samples 2, 7, 11, and 18, see Table 1) having R/W 0.25 and activation levels from 67%-78%. Comparison of FIGS. 7A and 7B clearly demonstrates a close correlation between the gravimetric storage capacity and the BET surface area and pore volume.

An R/C value that is either too high or too low drastically decreases the storage performance of the material. This behavior is explained in terms of the previously mentioned length scale at which phase separation occurs between the solvent and solid material in the gelling polymer network. In the RF system, the length scales of the microphase separation of the solid and solvent components are equal. The effect on the final carbon material is that for low R/C the width of both the pores and the solid portions are very small, whereas high R/C results in an open structure with large pores and correspondingly large solid portions. This rationale explains why a high R/C carbon cryogel exhibits relatively poor methane storage capacity. A high R/C carbon cryogel consists of relatively large solid chords of carbon separated by pores of a size beyond that which is beneficial for gas storage. The reduced performance of low R/C cryogels may be explained by drying- or pyrolysis-induced collapse of very small pores that result from highest catalyst concentrations. This agrees with the volume loss observed in some very low R/W cryogels. For a constant R/W of 0.01, R/C 50 cryogel volume loss was about 70%, whereas R/C 300 cryogel volume loss was only about 50%. Corresponding weight losses for these gels were 47% and 51% for the R/C 50 and R/C 300 cryogels, respectively. Related behavior such as reduced micropore volume and surface area at high or low R/C was also observed.

Figure 8A:
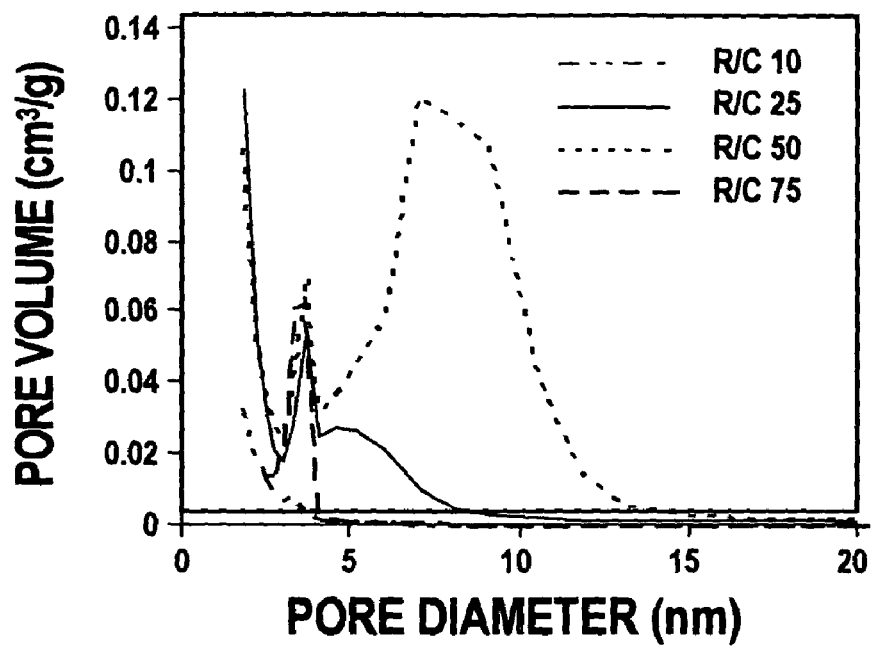
FIG. 8A is a graph comparing pore volume as a function of pore diameter for representative carbon cryogels of the invention (Samples 2 (R/C 10), 7 (R/C 25), 11 (R/C 50), and 18 (R/C 75), see Table 1) having R/W 0.25 and activation levels from 67%-78%.
Figure 8B:
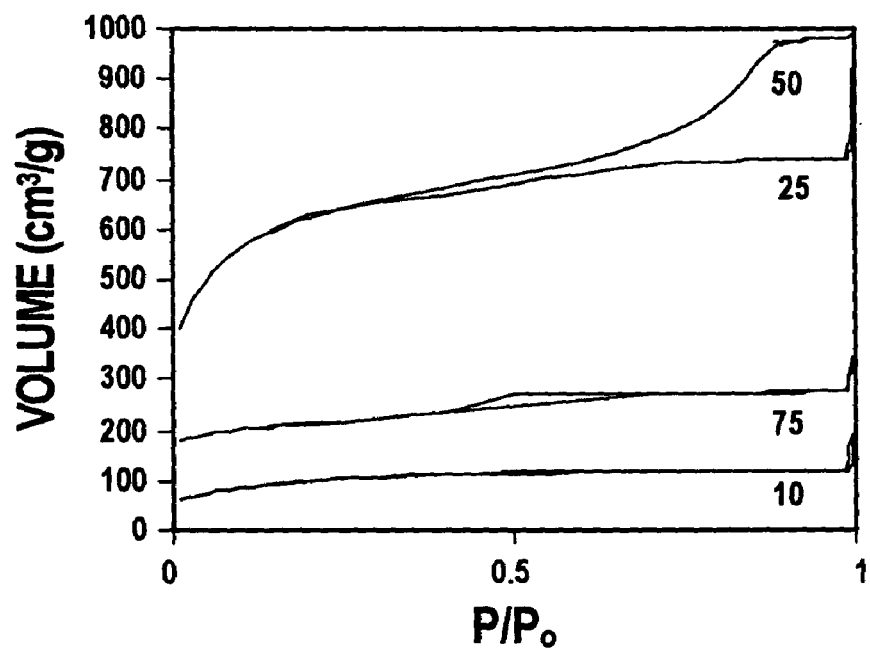
FIG. 8B is a graph comparing nitrogen sorption isotherms for representative carbon cryogels of the invention (Samples 2 (R/C 10), 7 (R/C 25), 11 (R/C 50), and 18 (R/C 75), see Table 1) having R/W 0.25 and activation levels from 67%-78%.

FIGS. 8A and 8B show pore size distribution and nitrogen sorption isotherms, respectively, for the same carbon cryogels noted in FIGS. 7A and 7B. FIG. 8A compares pore volume as a function of pore diameter for representative carbon cryogels of the invention (Samples 2 (R/C 10), 7 (R/C 25), 11 (R/C 50), and 18 (R/C 75), see Table 1) having R/W 0.25 and activation levels from 67%-78%. Depending on R/C, the carbon cryogels have either bimodal or trimodal pore size distribution. The mesoporous peak at 7-8 nm is typical of unactivated carbon cryogels and aerogels, whereas the microporous peak at less than about 2 nm has probably evolved from exposure of new micropores by carbon dioxide activation. The third peak at about 3 nm may represent preexisting pores or could be due to activation-induced widening of preexisting micropores. Although all samples contain noticeable amount of micropores (diameter <2 nm), carbon cryogels with R/C=25 and 50 possess appreciably greater micropores volumes than that of samples with R/C=10 and 75. By comparing the results illustrated in FIGS. 7 and 8, it becomes clear that the micropores play an important role in methane gas storage capacity. Comparison of cryogels having R/C 25 and R/C 50 revealed that the amount of mesopores (2<d<50 nm in diameter) is less important for gravimetric methane gas storage capacity, but does have an effect on the volumetric storage capacity. The large mesoporous peak in the R/C 50 cryogel, for example, is likely responsible for the drop in volumetric capacity of that cryogel due to its reduced density.

In one embodiment, carbon cryogels are fabricated from components having R/C of from about 5 to about 1500. In one embodiment, R/C is from about 10 to about 300. In one embodiment, R/C is from about 20 to about 60. In one embodiment, R/C is from about 25 to about 50.

Figure 9A:
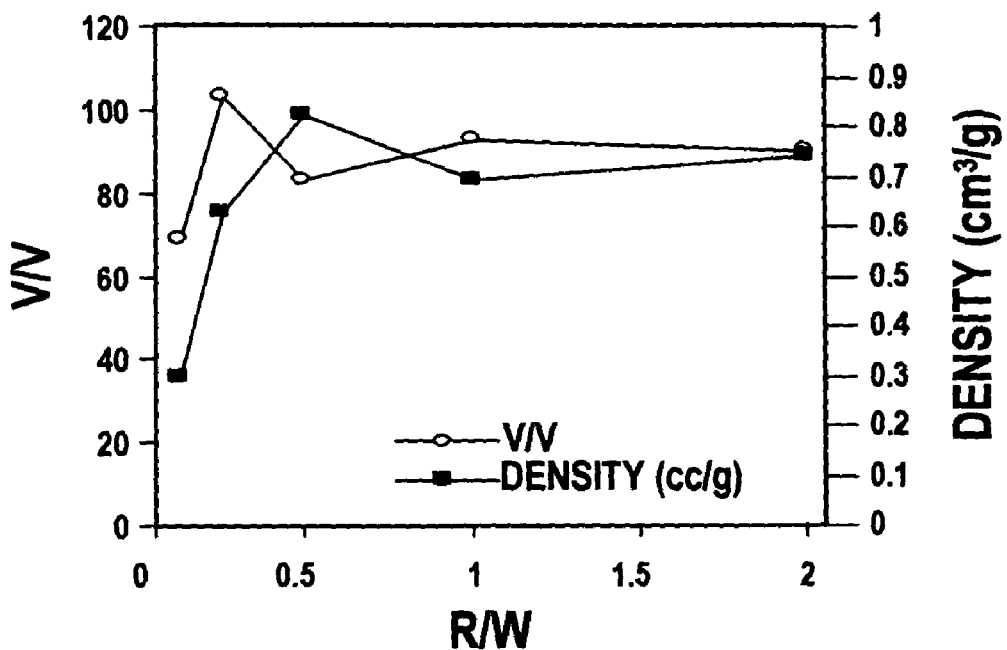
FIGS. 9A and 9B compare the volumetric performance (V/V) and density (g/cm$^3$) as a function of R/W, and the gravimetric performance (mole/g) and inverse density (cm$^3$/g) as a function of R/W on loose powder samples of representative carbon cryogels of the invention (Samples 14, 17, 12, 21, and 23, see Table 1) having R/C 75 and activation between 14% and 36%.
Figure 9B:
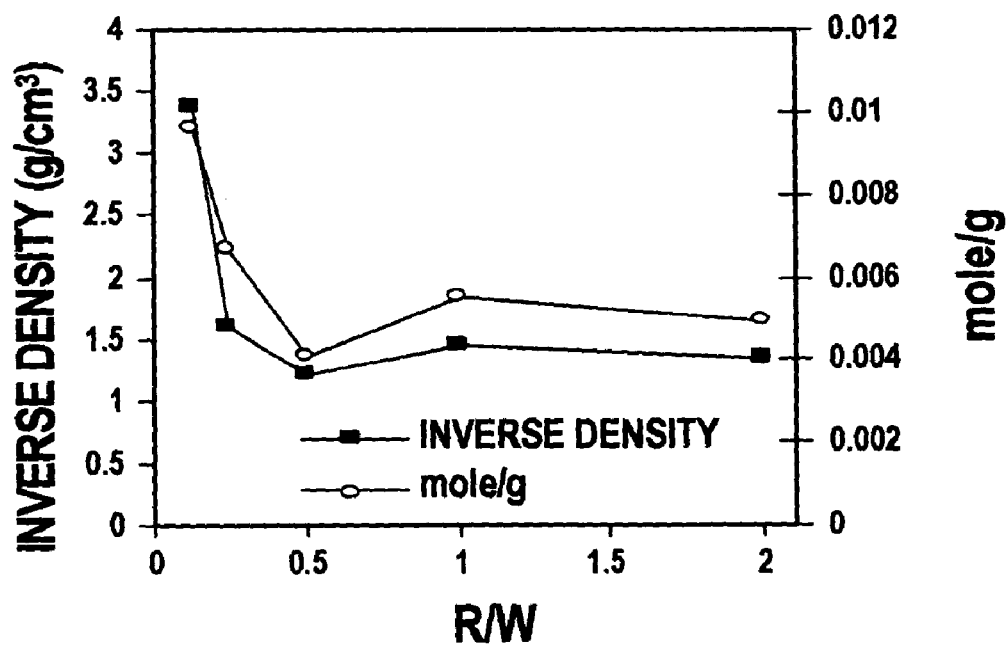

The effect of R/W on carbon cryogel methane storage capacity is illustrated in FIGS. 9A and 9B. FIGS. 9A and 9B compare the volumetric performance (V/V) and density (g/cm$^3$) as a function of R/W, and the gravimetric performance (mole/g) and inverse density (cm$^3$/g) as a function of R/W, respectively, on loose powder samples of representative carbon cryogels of the invention (Samples 14, 17, 12, 21, and 23, see Table 1) having R/C 75 and activation between 14% and 36%.

FIG. 9A shows the effect of R/W on nominal powder density and volumetric storage performance. Increasing the powder density increases the amount of storage material per unit volume, which should increase volumetric performance uniformly. Theoretically, increasing R/W (amount of organic precursor per unit volume) should be an effective way of increasing the volumetric storage capacity. Initially this is the case as V/V and powder density both increase dramatically when R/W increases from 0.125 to 0.25. Then, however, V/V abruptly decreases and then levels off. This can be explained in terms of the relationship between R/W, gravimetric storage performance, and nominal powder density (FIG. 9B). FIG. 9B shows that higher densities correspond to lower gravimetric storage capacity, thereby demonstrating that increasing the density of the final activated carbon cryogel by increasing R/W is not an efficient way to improve the volumetric performance. The reduced gravimetric performance implies that the additional precursor added for increasing R/W is reducing in terms of the storage efficiency of the final carbon cryogel.

The reduction in gravimetric performance may be explained in terms of the rapid gelation that was observed at high R/W. As with very high catalyst concentrations, at higher R/W, a limit may be reached where a significant amount of the final carbon cryogel is rendered non-porous. Once a threshold catalyst concentration is reached (for example, R/C 75), the high R/W would enable catalyzed crosslink formation to proceed very rapidly. The close proximity of precursors to one another could result in very dense crosslinking. This may be the same effect that drove pore sizes in the R/C experiments to the point where pores collapsed and reduced cryogel methane storage capacity.

Referring to FIG. 9A, the leveling of the density curve as R/W increases may be explained by a phenomena that was observed during gelation. In fabricating these materials it was noted that for materials at R/C 75 and R/W higher than 0.5, the gelation process was very fast (<10 min). A gas was formed during gelation that produced large bubbles in the gel. In a network that forms this rapidly it may be assumed that the formation of large bubbles during gelation might also indicate the presence of smaller undetectable bubbles that would cause a reduction in density. It may be possible to counter this effect by reducing the catalyst to slow down the reaction.

In one embodiment, carbon cryogels are fabricated from components having R/W of from about 0.01 to about 2.0. In one embodiment, R/W is from about 0.1 to about 1.0. In one embodiment, R/W is about 0.25.

Figure 10:
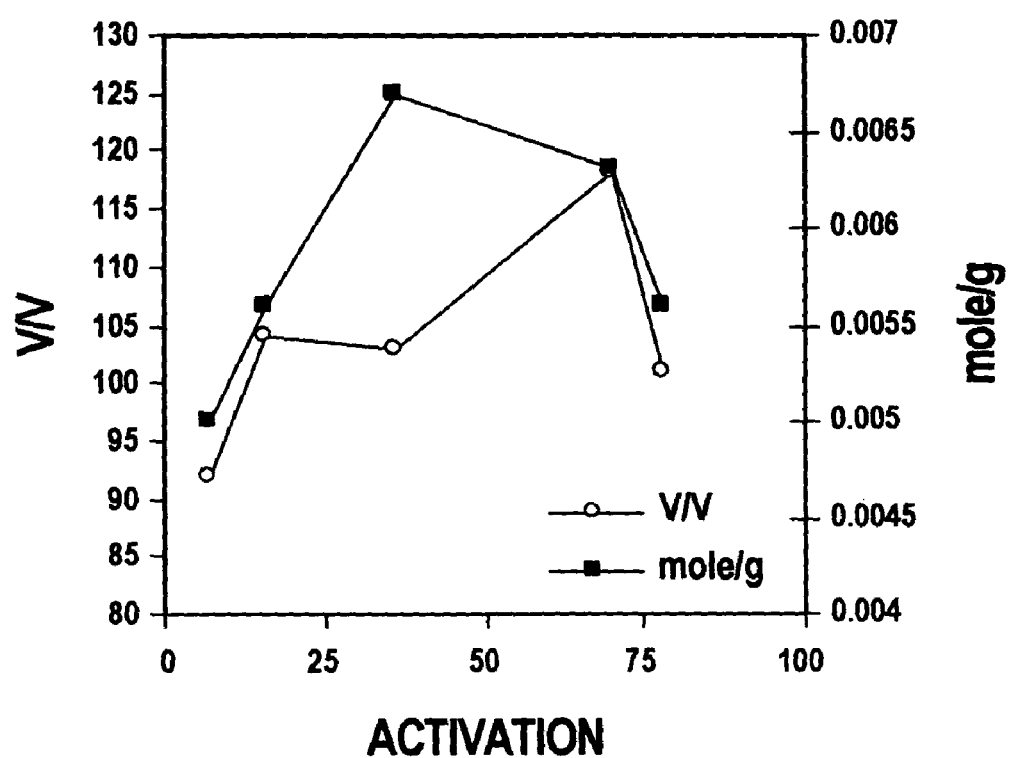
FIG. 10 is a graph comparing the effect of activation on methane storage performance (V/V and mole/g) for representative carbon cryogels of the invention (Samples 15-19, see Table 1) having R/C 75 and R/W 0.25 cryogels.

The effect of activation on carbon cryogel methane storage capacity is illustrated in FIG. 10. FIG. 10 compares the effect of activation on methane storage performance (V/V and mole/g) for representative carbon cryogels of the invention (Samples 15-19, see Table 1) having R/C 75 and R/W 0.25 cryogels. Referring to FIG. 10, an increase in both gravimetric and volumetric storage capacity with increased activation is initially observed, which is followed by a decline at activation greater than about 70%. The improvement in storage capacity on activation can be attributed to increased micropores as activation induces exposure of new micropores as demonstrated in FIG. 5. The increase in storage capacity continues to the point where fewer new micropores are revealed by activation and, with continued activation, the average pore size begins to increase and the surface area decreases. As a result, the gas storage capacity decreases sharply with further increase in activation.

In one embodiment, carbon cryogels are fabricated having activation of from about 5 to about 90%. In one embodiment, activation is from about 25 to about 75%. In one embodiment, activation is from about 60 to about 80%.

The present invention provides tunable carbon cryogels that exhibit properties that are desirable for efficient methane storage. In certain embodiments, the invention provides carbon cryogels having surface areas exceeding 2500 m$^2$/g, a high volume of pores having diameters less than about 2 nm, and high methane storage capacities (13.1 mMol/g). Process parameters R/C, R/W, and percent activation can all be used to tune the microporosity and hence storage performance of carbon cryogels. R/C plays an important role in determining the microporous structure and hence the methane storage capacity. R/W and activation percentage exert a noticeable influence on both micropore structure and methane storage capacity. The carbon cryogels of the invention can be used as porous sorbents for low pressure methane storage.

EXAMPLES

Example 1

Preparation of Representative Carbon Cryogels

The following chemicals were used in the preparation of carbon cryogels: resorcinol (99+%, Sigma-Aldrich, $C_6H_4(OH)_2$), formaldehyde solution (37%—stabilized with methanol ($CH_3OH$), Fisher Scientific, $CH_2O$), sodium carbonate (99.5%, Sigma-Aldrich, $Na_2CO_3$), trifluoroacetic acid (99%, Aldrich, $CF_3CO_2H$), and tert-butyl-alcohol (t-butanol) (99.8%, J. T. Baker, $(CH_3)_3COH$). These were used as received without further treatment. A series of carbon cryogels with initial composition listed in Table 1 were fabricated.

The molar ratio of resorcinol to formaldehyde was maintained at 1:2 for all sols, while the molar ratio of resorcinol to sodium carbonate catalyst (R/C) and the mass or molar ratio of resorcinol to water (R/W) were varied systematically. The sols were prepared by admixing resorcinol and formaldehyde in stirred deionized (DI) water then adding catalyst at room temperature. The resulting sols were sealed in glass ampules or vials and gelled by heating at 90° C. for at least 24 hours or until gelation was complete (as long as 7 days). No aging was applied after gelation. The resulting RF hydrogels underwent solvent exchange to replace water with t-butanol by rinsing 3 times in fresh t-butanol for 24 hours each time followed by subsequent freeze drying for 3 days. The resulting RF cryogels were pyrolyzed at 1050° C. in nitrogen for 4=hours and then activated at 900° C. in carbon dioxide with a flow rate of 400 SCCM for various durations. FIGS. 1A-1C are images of an RF hydrogel, an RF cryogel, a representative carbon cryogel of the invention, respectively. FIG. 1D is a transmission electron microscope (TEM) image (175,000×) of the carbon cryogel of FIG. 1C.

The initial compositions used to prepare a series of representative carbon cryogels of the invention are summarized in Table 1.

TABLE 1

Initial molar resorcinol/catalyst ratio (R/C), weight resorcinol/water ratio (R/W by weight), molar resorcinol/water ratio (R/W molar), and level of activation (% Activation expressed as percent original material removed).

| Sample Number | R/C | R/W by weight | R/W molar | % Activation |
|---|---|---|---|---|
| 1 | 10 | 0.250 | 0.041 | 33 |
| 2 | 10 | 0.250 | 0.041 | 67 |
| 3 | 100 | 0.250 | 0.041 | 30 |
| 4 | 100 | 0.250 | 0.041 | 42 |
| 5 | 25 | 0.125 | 0.020 | 33 |
| 6 | 25 | 0.250 | 0.041 | 28 |
| 7 | 25 | 0.250 | 0.041 | 75 |
| 8 | 300 | 0.125 | 0.020 | 35 |
| 9 | 50 | 0.050 | 0.005 | 12 |
| 10 | 50 | 0.250 | 0.041 | 35 |
| 11 | 50 | 0.250 | 0.041 | 68 |
| 12 | 75 | 0.500 | 0.082 | 24 |
| 13 | 75 | 0.125 | 0.020 | 24 |
| 14 | 75 | 0.125 | 0.020 | 33 |
| 15 | 75 | 0.250 | 0.041 | 7 |
| 16 | 75 | 0.250 | 0.041 | 16 |
| 17 | 75 | 0.250 | 0.041 | 36 |
| 18 | 75 | 0.250 | 0.041 | 70 |
| 19 | 75 | 0.250 | 0.041 | 78 |
| 20 | 75 | 1.000 | 0.164 | 0 |
| 21 | 75 | 1.000 | 0.164 | 14 |
| 22 | 75 | 1.000 | 0.164 | 56 |
| 23 | 75 | 2.000 | 0.327 | 26 |

Example 2

Preparation of Representative Carbon Cryogels

The representative carbon cryogels prepared as described in Example 1 were analyzed by transmission electron microscopy (TEM), and nitrogen sorption isotherms.

Figure 2:
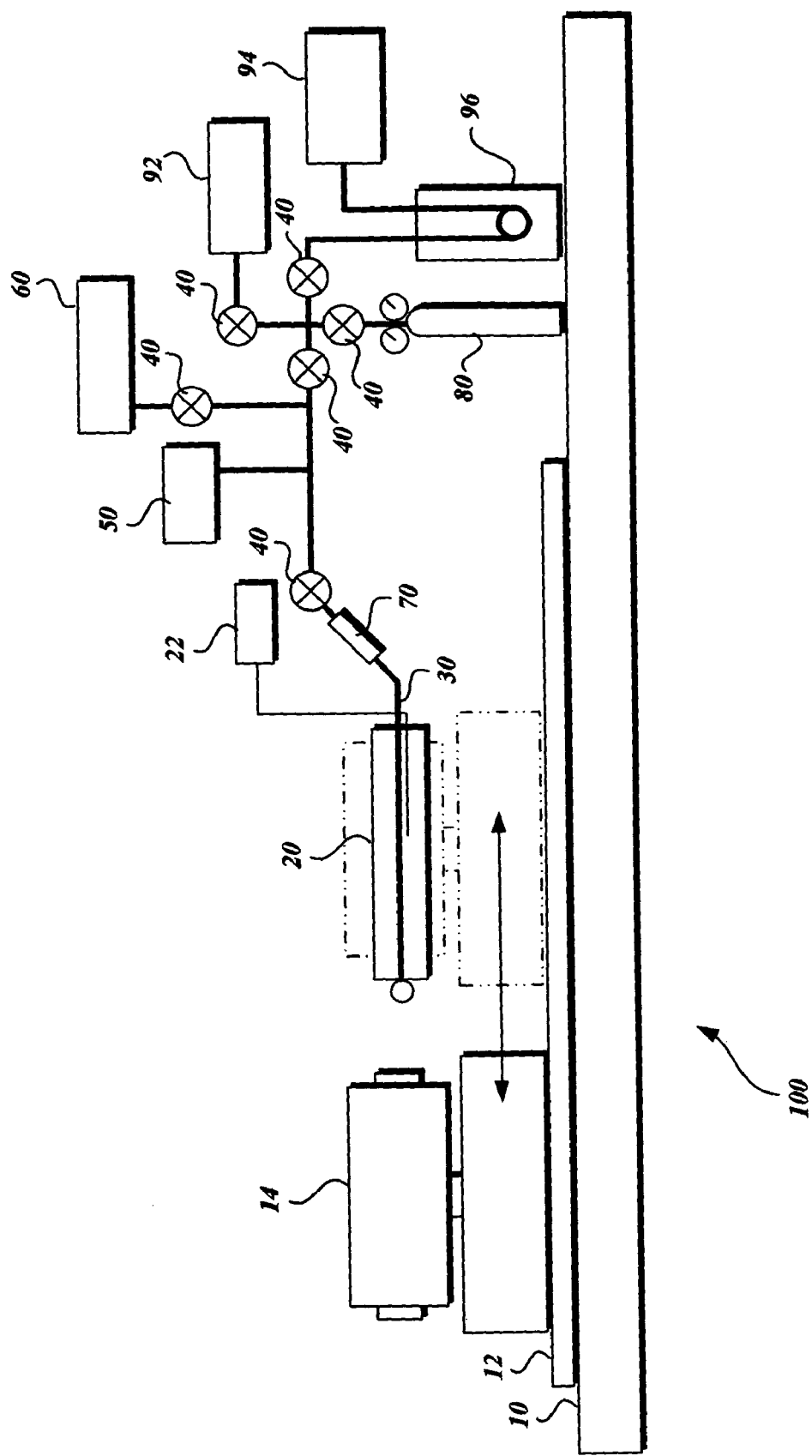
FIG. 2 is a schematic diagram of an apparatus for measuring methane adsorption/desorption for the carbon cryogels of the invention.

Methane storage analysis was perfomed using a Sievert's apparatus shown schematically in FIG. 2. Referring to FIG. 2, apparatus 100 includes bench 10 having rolling track 12, which moves tube furnace 14 (Thermolyne Tube Furnace 1200° C. maximum, Barnstead International, 2555 Kerper Boulevard, Dubuque, Iowa) in position surrounding chamber 20 housing the cyrogel sample to be tested. The chamber includes thermocouple 22. Gas is supplied to and removed from the chamber through tubing 30 (SS 316L AMS269, seamless, ¼ inch, Swagelok, 29500 Solon Road, Solon, Ohio) and regulated by valves 40 (Swagelok SS4BK). Pressure was measured by high pressure transducer 50 (Setra 225 1000 psi maximum, Setra, 159 Swanson Road, Boxborough, Mass.) and by low pressure transducer 60 (MKS D27B13TCECOBO, 45° C. dual range having 1000/100 torr accuracy of 0.12% reading, MKS Instruments, 90 Industrial Way, Wilmington, Mass.). Gas entering the chamber was passed through filter 70 (0.5 micron stainless steel filter). Gas was delivered to the chamber from gas tank 80. The chamber can be vented to fumehood 92. The chamber can be evacuated by vacuum pump 94 through trap (e.g., liquid nitrogen) 96.

Methane storage analysis using a Sievert's apparatus shown schematically in FIG. 2 was performed as follows. The samples were loaded into a glass slip inside a stainless steel tube without compaction and evacuated at a temperature of 200° C. prior to an adsorption test with high purity methane (99.99%). The amount of methane adsorbed was measured by dosing with known volumes of methane at stepwise increasing pressures up to about 4.5 MPa. Adsorption curves expressed in terms of volumetric performance (V/V) (volume of stored gas at standard temperature and pressure (STP) divided by volume of sample) and gravimetric performance (mole/g) (moles of methane adsorbed per gram of carbon) were calculated.

Adsorption storage capacities determined for representative carbon cryogels of the invention (Samples 1-23, Example 1) are summarized in Table 2.

TABLE 2

Activated carbon cryogel volumetric and gravimetric methane storage capacity and powder density.

| Sample Number | V/V | mol/g | density | % gravimetric |
|---|---|---|---|---|
| 1 | 60 | 0.0039 | 0.62 | 6.28 |
| 2 | 53 | 0.0029 | 0.75 | 4.63 |

TABLE 2-continued

Activated carbon cryogel volumetric and gravimetric methane storage capacity and powder density.

| Sample Number | V/V | mol/g | density | % gravimetric |
|---|---|---|---|---|
| 3 | 85 | 0.0089 | 0.39 | 14.30 |
| 4 | 76 | 0.0069 | 0.45 | 11.00 |
| 5 | 70 | 0.0123 | 0.23 | 19.80 |
| 6 | 100 | 0.0064 | 0.63 | 10.28 |
| 7 | 111 | 0.0119 | 0.38 | 19.08 |
| 8 | 22 | 0.0010 | 0.92 | 1.63 |
| 9 | 63 | 0.0127 | 0.20 | 20.36 |
| 10 | 91 | 0.0066 | 0.56 | 10.63 |
| 11 | 94 | 0.0131 | 0.29 | 21.05 |
| 12 | 83 | 0.0041 | 0.82 | 6.62 |
| 13 | 73 | 0.0104 | 0.29 | 16.69 |
| 14 | 69 | 0.0096 | 0.30 | 15.36 |
| 15 | 92 | 0.0050 | 0.74 | 8.07 |
| 16 | 104 | 0.0056 | 0.76 | 8.93 |
| 17 | 103 | 0.0067 | 0.63 | 10.75 |
| 18 | 118 | 0.0063 | 0.75 | 10.18 |
| 19 | 101 | 0.0056 | 0.73 | 9.03 |
| 20 | 78 | 0.0040 | 0.80 | 6.37 |
| 21 | 93 | 0.0055 | 0.69 | 8.80 |
| 22 | 96 | 0.0055 | 0.71 | 8.80 |
| 23 | 90 | 0.0049 | 0.74 | 7.90 |

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A carbon cryogel having a surface area of from about 1500 to about 3000 $m^2/g$, wherein said cryogel has a pore size distribution comprising:
   a) a peak for pores having a diameter less than 2 nm;
   b) a peak for pores having a diameter of about 3 nm; and
   c) a peak for pores having a diameter between 7 and 8 nm.

2. A carbon cryogel having a gravimetric methane storage capacity of 15-20%, a surface area of from about 2400 to about 2600 $m^2/g$, and a total pore volume of from about 1.0 to about 1.5 $cm^3/g$.

3. A carbon cryogel having a peak pore volume greater than about 0.1 $cm^3/g$ for pores having a diameter less than about 2 nm and having a peak pore volume greater than about 0.1 $cm^3/g$ for pores having a diameter of about 5 to about 12 nm.

4. The carbon cryogel of claim 3 further having a peak pore volume greater than about 0.04 $cm^3/g$ for pores having a diameter of about 2 to about 4 nm.

5. A carbon cryogel having a gravimetric methane storage capacity of about 0.009 to about 0.013 mol/g at room temperature and 500 psi, a surface area of from about 1500 to about 2500 $m^2/g$, and a total pore volume of from about 1.2 to about 1.5 $cm^3/g$.

6. The cryogel of claim 5, wherein said total pore volume is from about 1.4 to about 1.5 $cm^3/g$.

7. The cryogel of claim 5, wherein the pore volume is from about 1.2 to about 1.4 $cm^3/g$.

8. The carbon cryogel of claim 5 comprising mesopores having a diameter of about 5 to about 12 nm.

9. The carbon cryogel of claim 5 comprising mesopores having a diameter of about 2 to about 4 nm.

10. The carbon cryogel of claim 5, wherein said surface area is from about 1500 to about 2000 $m^2/g$.

11. The carbon cryogel of claim 5, wherein said surface area is from about 2000 to about 2500 $m^2/g$.

12. A gas storage vessel, comprising a vessel and a carbon cryogel having a gravimetric methane storage capacity of about 0.009 to about 0.013 mol/g at room temperature and 500 psi, a surface area of from about 1500 to about 2500 $m^2/g$, and a total pore volume of from about 1.2 to about 1.5 $cm^3/g$.

13. The gas storage vessel of claim 12, further comprising a gas adsorbed on said carbon cryogel wherein said gas is selected from the group consisting of methane, hydrogen, nitrogen, carbon monoxide, fluorine, nitric oxide, nitrogen trifluoride, silane, ethylene, boron trifluoride, phosphine, arsine, disilane, and carbon tetrafluoride.

14. A method for making the carbon cryogel of claim 5, comprising:
   (a) preparing a sol by mixing resorcinol, formaldehyde, and a catalyst in water;
   (b) gelling the sol by heating at a temperature and for a time sufficient to provide a gel;
   (c) washing the gel with acid to provide an acid-washed gel comprising an aqueous solvent;
   (d) washing the acid-washed gel with a suitable organic solvent to exchange the aqueous solvent for an organic solvent to provide a solvent-exchanged gel;
   (e) freeze drying the solvent-exchanged gel; and
   (f) pyrolyzing the solvent-exchanged gel to provide a carbon cryogel.

15. The method of claim 14, wherein the molar ratio of resorcinol to catalyst is from about 10 to about 300.

16. The method of claim 14, wherein the catalyst is sodium carbonate.

17. The method of claim 14, wherein the weight ratio of resorcinol to water is from about 0.01 to about 2.0.

18. The method of claim 14, wherein gelling the sol comprises heating at a temperature and for a period of time sufficient to convert the sol to a crosslinked gel.

19. The method of claim 14, wherein gelling the sol comprises heating at about 900° C. for from about 1 to about 7 days.

20. The method of claim 14, wherein washing the gel with acid comprises washing the gel with aqueous trifluoroacetic acid.

21. The method of claim 14, wherein washing the acid-washed gel comprises washing the gel with t-butanol.

22. The method of claim 14, wherein pyrolyzing the solvent-exchanged gel comprises heating at a temperature and for a period of time sufficient to convert the gel to a carbon cryogel.

23. The method of claim 14, wherein pyrolyzing the solvent-exchanged gel comprises heating at about 1050° C. for about 4 hours under nitrogen.

24. The method of claim 14, wherein heating at a temperature and for a time sufficient to provide an activated carbon cryogel comprises heating at about 900° C. under carbon dioxide.

25. The method of claim 14, further comprising heating the carbon cryogel at a temperature and for a time sufficient to provide an activated carbon cryogel.

26. The method of claim 25, wherein the temperature is about 900° C. and the time is from about 10 to about 120 minutes.

27. The method of claim 25, wherein the activation is from about 5 to about 90%.

* * * * *